Patented Dec. 27, 1938

2,141,877

UNITED STATES PATENT OFFICE 2,141,877

COMPOUNDS OF THE BENZANTHRAQUINONE SERIES

William L. Rintelman, Carrollville, Wis., assignor to E. I. du Pont de Nemours & Company, Wilmington, Del., a corporation of Delaware No Drawing. Application July 31, 1937, Serial No. 156,705

4 Claims. (Cl. 260—365)

This invention relates to the preparation of new compounds of the 1,2-benzanthraquinone series and more particularly to the preparation of new 3-amino-1,2-benzanthraquinone-4-sulfides, disulfides, and their halogen and alkalimetal derivatives.

The object of the invention is to produce new dyestuff intermediates which are particularly suitable for the manufacture of valuable dyestuffs which dye cotton in reddish yellow to orange and brown shades of good fastness properties.

These new dyestuff intermediates may be prepared by treating 3-amino-1,2-benzanthraquinone with sulfur mono-halide (chloride or bromide) in an inert organic solvent to give, first, the 3-amino-1,2-benzanthraquinone-4-halogen disulfide. This new 3-amino-1,2-benzanthraquinone-4-halogen disulfide on treatment with sodium hydroxide or other alkali is readily converted to a mixture of the corresponding 3-aminobenzanthraquinone-4-sodium disulfide and 3-aminobenzanthraquinone-4-sodium sulfide. On treating the 4-halogen disulfide compound with an alkali in the presence of a reducing agent, it is converted substantially quantitatively to the 3-aminobenzanthraquinone-4-sodium sulfide. Both the 3-aminobenzanthraquinone-4-sodium disulfide and -sodium sulfide compounds are readily converted to the 3-aminobenzanthraquinone hydrogen disulfide and hydrogen sulfide respectively on treatment with acids, and the 3-aminobenzanthraquinone-4-hydrogen disulfide can be readily converted to the 3-aminobenzanthraquinone-4-sodium sulfide on treatment with reducing agents in the presence of an alkali. The 3-aminobenzanthraquinone-4-sodium sulfide is converted by means of mild oxidizing agents to the 3,3'-diamino-1,2,1',2'-dibenzanthraquinonyl-4,4'-disulfide. The 3-aminobenzanthraquinone sodium sulfide and corresponding dibenzanthraquinonyl disulfide, as well as the 3-aminobenzanthraquinone hydrogen sulfide, serve as valuable intermediates for the preparation of dyestuffs of the thiazole series, for they may be reacted with aldehydes in the known manner; while the 3-aminobenzanthraquinone-4-sodium sulfide also serves as a valuable intermediate for the preparation of the corresponding thioglycollic acids on treatment with chloroacetic acid compounds.

The following chart illustrates the reactions and the new compounds of this invention and the numbering of the benzanthraquinone molecule which will be adhered to throughout this specification:

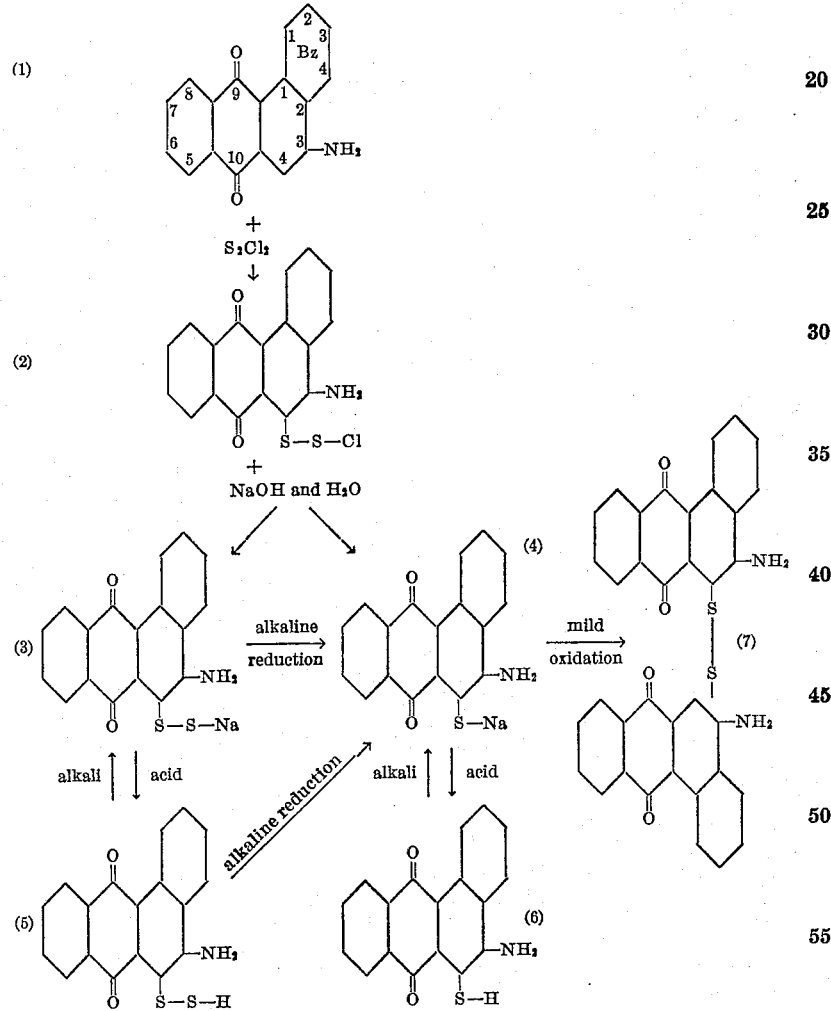

The following nomenclature is employed throughout the specification to designate the compounds which in the chart are numbered as follows:

1. 3-aminobenzanthraquinone.
2. 3-amino-1,2- benzanthraquinone - 4 - chloro disulfide.
3. 3-amino-1,2-benzanthraquinone- 4 - sodium disulfide.
4. 3-amino-1,2-benzanthraquinone- 4 - sodium sulfide.
5. 3-amino-1,2-benzanthraquinone - 4 - hydrogen disulfide.
6. 3-amino-1,2-benzanthraquinone - 4 - hydrogen sulfide.
7. 3,3'- diamino - 1,2,1',2' - dibenzanthraquinonyl-4,4'-disulfide.

The following examples are given to illustrate a preferred process for the manufacture of these new dyestuff intermediates.

*Example 1*

30 parts of 3-amino-1,2-benzanthraquinone (made by amidating the chloro body with strong aqueous ammonia under pressure in the presence of cuprous chloride and sodium chlorate) are suspended in 500 parts of dry o-dichlorobenzene. At room temperature a stream of dry hydrochloric acid gas is passed into the suspension until the orange crystals of the free amine are completely converted to the steel gray crystals of what is probably the hydrochloride of the amine.

90 parts of sulfur mono-chloride are now added and the mass is heated to 70° C. and held at this temperature until the evolution of hydrochloric acid gas has stopped. This requires about 7 to 8 hours. The gray semi-amorphous suspension of the hydrochloride changes over to one of red needles during the heating. When the reaction is complete, the suspension is cooled to 25° C. and filtered, washed with o-dichlorobenzene and benzene in turns, and then dried. The red needle-like crystals of 3-amino-1,2-benzanthraquinone-4-chlorodisulfide dissolve to a small extent in hot o-dichlorobenzene, imparting to it a deep red color which on cooling deposits red needle-like crystals. The product dissolves in 95% sulfuric acid with a red coloration. It is soluble in dilute sodium hydroxide solution with a blue color. The blue color is due to the replacement of the chlorine of the disulfur chloride body by sodium. This 3-aminobenzanthraquinone-4-sodium disulfide may be salted out from the blue solution by the addition of sodium chloride and may be isolated as a blue crystalline salt and dried at 100° C. without decomposition.

If the blue solution of the sodium disulfide compound is made acid with mineral acids, a red precipitate of 3 - amino-benzanthraquinone-4-hydrogen disulfide is thrown down and may also be isolated and dried at 100° C. without decomposition. If this compound is treated with alkaline hydrosulfide at 70° C. a yellow solution of the vat is formed, which on careful oxidation with air changes to green, then to blue, and finally an insoluble red precipitate is formed. This 3,3'-diamino-1,2,1',2'-dibenzanthraquinonyl-4,4'-disulfide may be filtered off and dried at 100° C. without injury. This dibenzanthraquinonyl disulfide is quite insoluble in hot organic solvents, but may be dissolved to some extent in boiling alpha-mono-chloronaphthalene from which it is deposited in orange crystals on cooling. When treated with alcoholic sodium sulfide solution, it dissolves with a green color, being reconverted to the benzanthraquinone sodium sulfide. On vatting with alkaline hydrosulfite the dibenzanthraquinonyl disulfide is reconverted to the leuco of the benzanthraquinone sodium sulfide, which gives a yellow solution.

*Example 2*

60 parts of 3-amino-1,2-benzanthraquinone (purified by being recrystallized from 10 parts o-dichlorobenzene) are suspended in 60 parts o-dichlorobenzene and converted to the hydrochloride by passing a stream of dry hydrochloric acid gas into the suspension. 29 parts of sulfur mono-bromide (made by mixing atomic proportions of sulfur and bromine) are added and the suspension heated to 85° C. and held at this temperature for 18 hours. At the end of this period it is heated to 140° C. for one-half hour, cooled to 70° C. and filtered. The filter cake is washed with dry benzene and then with ether, and dried. The dry cake is suspended in 2000 parts of cold water and under agitation 20 parts of sodium carbonate are added. The blue solution is filtered and acidified. The red precipitate which is thrown down is filtered off and redissolved in 1000 parts of water containing 60 parts of caustic soda. 60 parts of sodium hydrosulfite are added and the solution heated to 70° C. for one-half hour. A stream of air is now passed through the solution until precipitation of the disulfide is complete, after which it may be filtered off and dried on the steam bath.

Instead of first extracting the dried solvent cake from the sulfur bromide reaction with sodium carbonate, the crude cake itself may be vatted and re-oxidized with air or other mild oxidizing agents, such as perborates, and this oxidized cake suspended in alcohol and heated with an excess of sodium sulfide, filtered free of insoluble impurities and then precipitated as the free mercaptan by adding dilute mineral acids, or it may be oxidized to the disulfide with mild oxidizing agents.

*Example 3*

20 parts of 3-amino-1,2-benzanthraquinone are suspended in 400 parts of toluol, and 60 parts of sulfur mono-chloride are added. The suspension is heated slowly to 80° C. and held at this temperature until the evolution of hydrochloric acid stops. It is then cooled to 25° C. and filtered, washed with toluene and dried. The crude cake is suspended in 2000 parts of water. 30 parts of caustic soda and then 30 parts of sodium hydrosulfite are added under agitation. The solution is heated to 70° C. for one-half hour and then oxidized to the disulfide with meta-nitrobenzene sulfonic acid ("Sitol"). The crude 3,3'-diamino-dibenzanthraquinonyl-4,4'-disulfide may be conveniently purified by extraction with hot alcoholic sodium sulfide solution and the alcoholic solution of the sodium salt re-oxidized by diluting with water and treating with air.

I claim:
1. The 3-amino-1,2-benzanthraquinone sulfides and disulfides of the following general formula

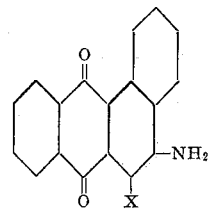

wherein X stands for a radical of the class consisting of —SH, —SM, —SSH, —SSM, —SSHal, and
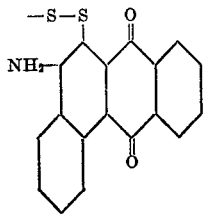
and M stands for an alkali-metal.
2. 3-amino-1,2-benzanthraquinone-4-hydrogen sulfide.
3. 3-amino-1,2-benzanthraquinone - 4 - sodium sulfide.
4. 3,3'-diamino - 1,2,1',2' - dibenzanthraquinonyl-4,4'-disulfide.
WILLIAM L. RINTELMAN.